(12) United States Patent
McMillen (10) Patent No.: US 6,652,029 B2
(45) Date of Patent: Nov. 25, 2003

(54) UNITIZED BACK PLATE AND LUMBAR SUPPORT

(75) Inventor: Robert McMillen, Tecumseh (CA)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 10/029,335

(22) Filed: Dec. 20, 2001

(65) Prior Publication Data

US 2003/0117002 A1 Jun. 26, 2003

(51) Int. Cl.$^7$ ............................................. A47C 3/025

(52) U.S. Cl. ........................ 297/284.4; 297/284.8; 297/284.7

(58) Field of Search .................... 297/284.4, 284.8, 297/284.7, 378.12

(56) References Cited

U.S. PATENT DOCUMENTS

| | | | |
|---|---|---|---|
| 1,182,854 A | 5/1916 | Poler | |
| 2,756,809 A | 7/1956 | Endresen | 155/182 |
| 2,843,195 A | 7/1958 | Barvacus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,724,144 A | 4/1973 | Schuster | 52/108 |
| 3,762,769 A | 10/1973 | Poschl | 297/284 |
| 4,014,422 A | 3/1977 | Morishita | 192/67 |
| 4,136,577 A | 1/1979 | Borgersen | 74/479 |
| 4,153,293 A | 5/1979 | Sheldon | 297/284 |
| 4,156,544 A | 5/1979 | Swenson et al. | 297/284 |
| 4,182,533 A | 1/1980 | Arndt et al. | 297/284 |
| 4,295,681 A | 10/1981 | Gregory | 297/284 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,390,210 A | 6/1983 | Wisniewski et al. | 297/452 |
| 4,449,751 A | 5/1984 | Murphy et al. | 297/284 |

(List continued on next page.)

FOREIGN PATENT DOCUMENTS

| | | | |
|---|---|---|---|
| AT | 401 497 | 9/1996 | B60N/2/22 |
| DE | 2040794 | 7/1971 | A47C/7/28 |
| DE | 206 4419 | 7/1972 | B60N/1/06 |
| DE | 29 47 472 | 8/1980 | B60N/1/00 |
| DE | 201 07 424 U1 | 11/2001 | B60N/2/62 |
| EP | 0 006 840 B1 | 2/1982 | A47C/23/00 |
| EP | 0 169 293 B1 | 10/1988 | A47C/7/46 |
| EP | 0 322 535 A1 | 7/1989 | A47C/7/46 |
| EP | 0 485 483 B1 | 1/1994 | A47C/7/46 |
| EP | 0 434 660 B1 | 5/1995 | A47C/7/46 |
| EP | 0 540 481 B1 | 12/1995 | A47C/7/46 |
| EP | 0 662 795 B1 | 12/1996 | A47C/7/46 |
| EP | 0 702 522 B1 | 3/1997 | A47C/7/46 |
| EP | 0 696 251 B1 | 7/1997 | B60N/2/44 |
| EP | 0 746 219 B1 | 11/1998 | A47C/7/46 |
| EP | 0 797 399 B1 | 11/1998 | A47C/7/46 |
| EP | 0 698 360 B1 | 3/2000 | A47C/7/46 |
| FR | 2 596 334 | 10/1987 | B60N/1/06 |
| GB | 849 798 | 9/1960 | |
| GB | 1 423 617 | 2/1976 | A47C/7/46 |
| GB | 2 013 487 | 2/1978 | A47C/7/46 |
| JP | 63-232046 | * 9/1988 | |
| RU | 587924 | 2/1978 | A47C/7/46 |
| WO | WO/00/00064 | 1/2000 | A47C/3/025 |

*Primary Examiner*—Laurie K. Cranmer
(74) *Attorney, Agent, or Firm*—Robert C. Haldiman, Esq.; Grant D. Kang, Esq.; Husch & Eppenberger, LLC (57) ABSTRACT

A unitized back plate and lumbar support device for a seat including a back plate, a housing with a channel, which housing is fixedly attached to the back plate, and an extending paddle. The extending paddle has a free end with a pressure surface, the surface being a load bearing element proximal to a seat occupant, and the extending paddle has an encapsulated end in extendible communication with the channel in the housing. An actuator mediates travel of the extending paddle between a substantially retracted position and an extended position.

31 Claims, 10 Drawing Sheets

U.S. PATENT DOCUMENTS

| | | | |
|---|---|---|---|
| 4,452,485 A | 6/1984 | Schuster | 297/284 |
| 4,465,317 A | 8/1984 | Schwarz | 297/284 |
| 4,494,709 A | 1/1985 | Takada | 242/107.6 |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,561,606 A | 12/1985 | Sakakibara et al. | 242/107 |
| 4,564,235 A | 1/1986 | Hatsutta et al. | 297/284 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,627,661 A | 12/1986 | Ronnhult et al. | 297/284 |
| 4,632,454 A | 12/1986 | Naert | 297/284 |
| 4,676,550 A | 6/1987 | Neve De Mevergnies | 297/353 |
| 4,679,848 A | 7/1987 | Spierings | 297/284 |
| 4,730,871 A | 3/1988 | Sheldon | 297/230 |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 5,005,904 A | 4/1991 | Clemens et al. | 297/284 |
| 5,022,709 A | 6/1991 | Marchino | 297/452 |
| 5,026,116 A | 6/1991 | Dal Monte | 297/284 |
| 5,050,930 A | 9/1991 | Schuster et al. | 257/284 |
| 5,076,643 A | 12/1991 | Colasanti et al. | 297/284 |
| 5,088,790 A | 2/1992 | Wainwright et al. | 297/284 |
| 5,137,329 A | 8/1992 | Neale | 297/284 |
| 5,174,526 A | 12/1992 | Kanigowski | 244/122 |
| 5,186,412 A | 2/1993 | Park | 242/245 |
| 5,197,780 A | 3/1993 | Coughlin | 297/284.7 |
| 5,215,350 A | 6/1993 | Kato | 297/284.4 |
| 5,217,278 A | 6/1993 | Harrison et al. | 297/284.7 |
| 5,286,087 A | 2/1994 | Elton | 297/284.7 |
| 5,299,851 A | 4/1994 | Lin | 297/284.5 |
| 5,335,965 A | 8/1994 | Sessini | 297/284.4 |
| 5,385,531 A | 1/1995 | Jover | 601/99 |
| 5,397,164 A | 3/1995 | Schuster | 297/284.1 |
| 5,423,593 A | 6/1995 | Nagashima | 297/284.5 |
| 5,449,219 A | 9/1995 | Hay et al. | 297/284.4 |
| 5,452,868 A | 9/1995 | Kanigowski | 244/122 R |
| 5,474,358 A | 12/1995 | Maeyaert | 297/284.7 |
| 5,498,063 A | 3/1996 | Schuster et al. | 297/284.1 |
| 5,518,294 A | 5/1996 | Ligon, Sr. et al. | 297/284.4 |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,588,703 A | 12/1996 | Itou | 297/284.4 |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,704,687 A | 1/1998 | Klingler | 297/284.4 |
| 5,718,476 A | 2/1998 | De Pascal et al. | 297/284.4 |
| 5,758,925 A | 6/1998 | Schrewe et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A | 8/1998 | Van Hekken et al. | 297/284.4 |
| 5,816,653 A | 10/1998 | Benson | 297/284.4 |
| 5,823,620 A | 10/1998 | Le Caz | 297/284.4 |
| 5,857,743 A | 1/1999 | Ligon, Sr. et al. | 297/284.9 |
| 5,868,466 A | 2/1999 | Massara et al. | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |
| 6,036,265 A | 3/2000 | Cosentino | 297/284.4 |
| 6,045,185 A | 4/2000 | Ligon, Sr. et al. | 297/284.4 |
| 6,050,641 A | 4/2000 | Benson | 297/284.4 |
| 6,079,783 A | 6/2000 | Schuster, Sr. et al. | 297/284.4 |
| 6,092,871 A | 7/2000 | Beaulieu | 297/284.4 |
| 6,152,531 A | 11/2000 | Deceuninck | 297/284.4 |
| 6,152,532 A | 11/2000 | Cosentino | 297/284.4 |
| 6,158,300 A | 12/2000 | Klingler | 74/526 |
| 6,227,617 B1 | 5/2001 | von Möller | 297/284.4 |
| 6,227,618 B1 | 5/2001 | Ligon, Sr. et al. | 297/284.4 |
| 6,254,186 B1 | 7/2001 | Falzon | 297/284 |
| 6,254,187 B1 | 7/2001 | Schuster, Sr. et al. | 297/284.1 |
| 6,270,158 B1 | 8/2001 | Hong | 297/284.4 |
| 6,296,308 B1 | 10/2001 | Cosentino et al. | 297/284.4 |
| 6,334,651 B1 | 1/2002 | Duan et al. | 297/284.4 |

\* cited by examiner

UNITIZED BACK PLATE AND LUMBAR SUPPORT

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

This invention relates to the combination of back supports and lumbar supports for seats.

2. Related Art

The design and assembly of seats, particularly automobile seats, frequently involves incorporation of back plates or lumbar supports. Back plates can provide structural support and can provide an anchor for fixation of various components. In automobiles, seat back plates also augment crashworthiness.

Modern seat design also commonly includes lumbar support for the comfort of the person sitting in the seat. In automobile seat design, it is becoming more common for seats to incorporate a variety of components for passenger comfort, including heating and cooling ducts and the like. This promulgation of components within the confines of a seat creates a need for more compact components. Saving space is also served by reducing the number of brackets and fixation devices needed to assemble various components together. An example of a particularly compact lumbar support is found in U.S. patent application Ser. No. 09/798,657, the disclosure of which is incorporated herein by reference.

Economy, efficiency and speed of assembly are always a concern in manufacturing industries, particularly the automobile industry. There is a constant need for reducing costs of component assembly and packaging for shipments of those components between manufacturers and assemblers of them. To the extent that various components of back plates and lumbar supports are manufactured separately, and then shipped to an assembler for fixation of new components with external, unintegrated fixation devices, and then shipped forward for further assembly into seats and then automobiles, efficiency and economy of assembly have not been maximized in the prior art.

There is a need in seat assembly procedures to increase the economy and efficiency of component assembly and shipping. There is a further need in seat design for strong, economical, compact components. There is a particular need for a strong, economical combination of a lumbar support with a back plate.

SUMMARY OF THE INVENTION

The invention is a unitized back plate and lumbar support. A back plate and lumbar support housing are molded together out of a single piece of plastic. The housing is optimally configured to be a concave component, defining a channel into which a lumbar support paddle may be retracted, and out of which the paddle may be extended in order to support a seat occupant's lumbar spine. The travel of the lumbar support paddle may be mediated by a motor or a mechanical means.

The present invention makes the combination of components within a seat more compact, especially with regard to eliminating the bulk and number of fixation devices required. Component manufacture, assembly, packaging, shipping and sales are more economical and efficient. It uses a relatively small number of moving parts which are simple in design and movement. The present invention streamlines the manufacture of the device and of seats incorporating the device, lowers production costs and increases durability and the useable life of the device and seats incorporating it. The present invention is able to tolerate excessive or abusive loads, as well as improve crash worthiness.

More than one support device may be incorporated in a single seat for a plurality of supports, including but not limited to lumbar support or double lumbar support.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 1A:
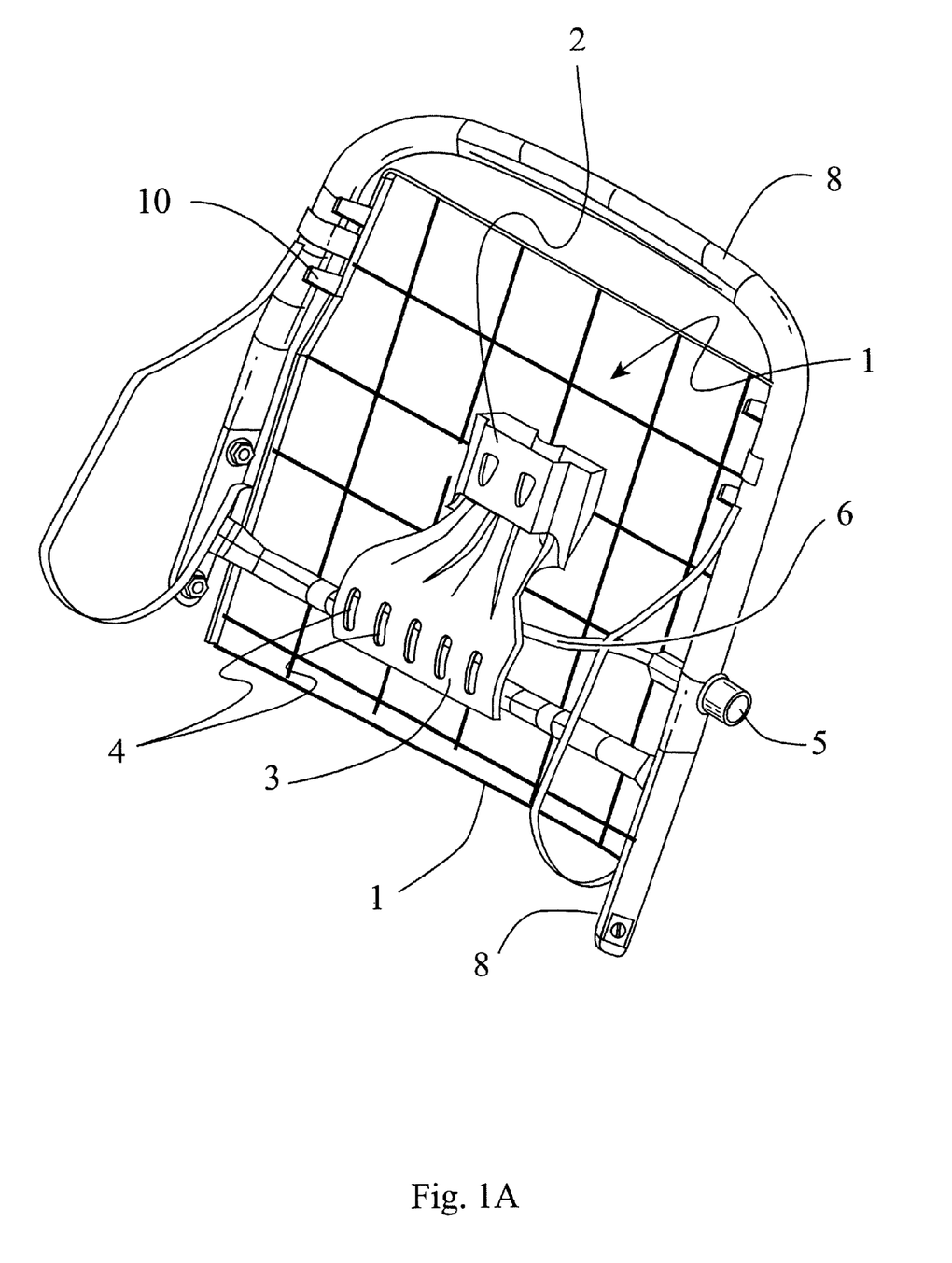
FIG. 1A is a front, perspective view of the unitized back plate and lumbar support device of the present invention with the lumbar support paddle in an extended position.
Figure 1B:
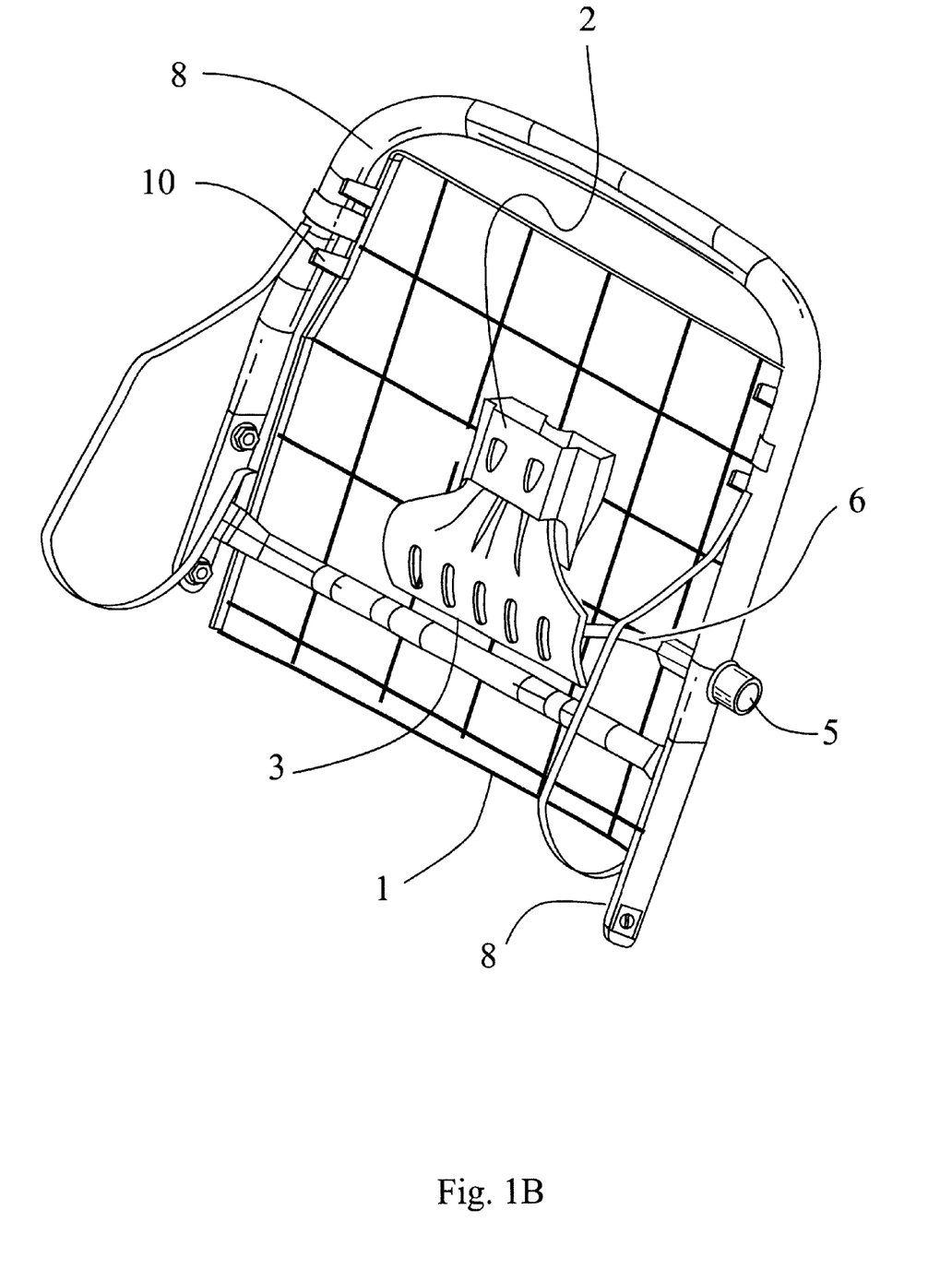
FIG. 1B is a front, perspective view of the unitized back plate and lumbar support device of the present invention with the lumbar support paddle in a retracted position.

Referring to the accompanying drawings in which like reference numbers indicate like elements, FIG. 1 is a front view of the unitized back plate and lumbar support of the present invention. The back plate, 1, may be made of metal or plastic. The lumbar support housing, 2, is fixed to the back plate, 1. Preferably, housing, 2, is fabricated from the same piece of material as back plate, 1. This fabrication may consist of stamping or casting if back plate, 1, and housing, 2, are made of metal, or molding if back plate, 1, and housing, 2, are made out of plastic.

The lumbar support paddle, 3, is a separate piece from the unitized back plate and lumbar support housing, 1 and 2. A degree of flexion is desirable in the paddle, whether it is made of metal or plastic. Lumbar support paddle, 3, has an unanchored end oriented toward the bottom of FIG. 1, and an engaged end oriented toward the top of FIG. 1 and inserted into a channel within housing, 2. The unanchored end of lumbar support paddle, 3, embodies the lumbar support surface to be extended outwards from the seat and into proximal contact with the lumbar spine of the seat occupant. (A seat cushion covers the paddle.) Holes, 4, may be included to increase the flexibility of the unanchored end of paddle, 3.

Actuator, 5, is located to the side of seat frame, 8, and connects under the lumbar support paddle, 3. Extension of the lumbar support paddle, may be actuated by an electric motor or by mechanical means, such as a bowden cable. Accordingly, actuator, 5, may be a switch for an electrical motor. A simple electrical wire, 6, connects the actuator motor with a switch placed anywhere on seat frame, 8, where a seat occupant may reach the switch. Actuator, 5, may alternatively be a mechanical device, for example, a Bowden cable. In that case, actuator, 5, represents a knob for turning the Bowden cable and 6 represents the Bowden cable conduit.

In either case, the actuator is engaged with the paddle, typically through a rod or cable, in order to mediate travel between the paddle's extended position and retracted position. This engagement is by means of traction in the depicted embodiment, where actuator, 5, represents a mechanical device for tensioning the cable, such as a wheel or lever. Element 6 is a cable, for example, a bowden cable, with its conduit anchored at conduit anchor, 12, and the internal wire, 14, fixed to the paddle, 3. The other end of the Bowden cable is anchored at the actuator, 5, in a position accessible by a seat occupant. Return of the lumbar support paddle from an extended to a retracted position is facilitated by means of springs, 7 to augment the return bias naturally provided by the passenger's weight.

The back plate, 1, may be attached to any of a variety of seat frames, such as a tubular steel frame, 8, by conventional fixation brackets, 10. Preferably, such brackets are molded into the back plate, 1, as well, although equivalent embodiments would use brackets welded to seat frame, 8, or separate brackets, 10, fixedly attached to both seat frame, 8, and back plate, 1.

Figure 2:
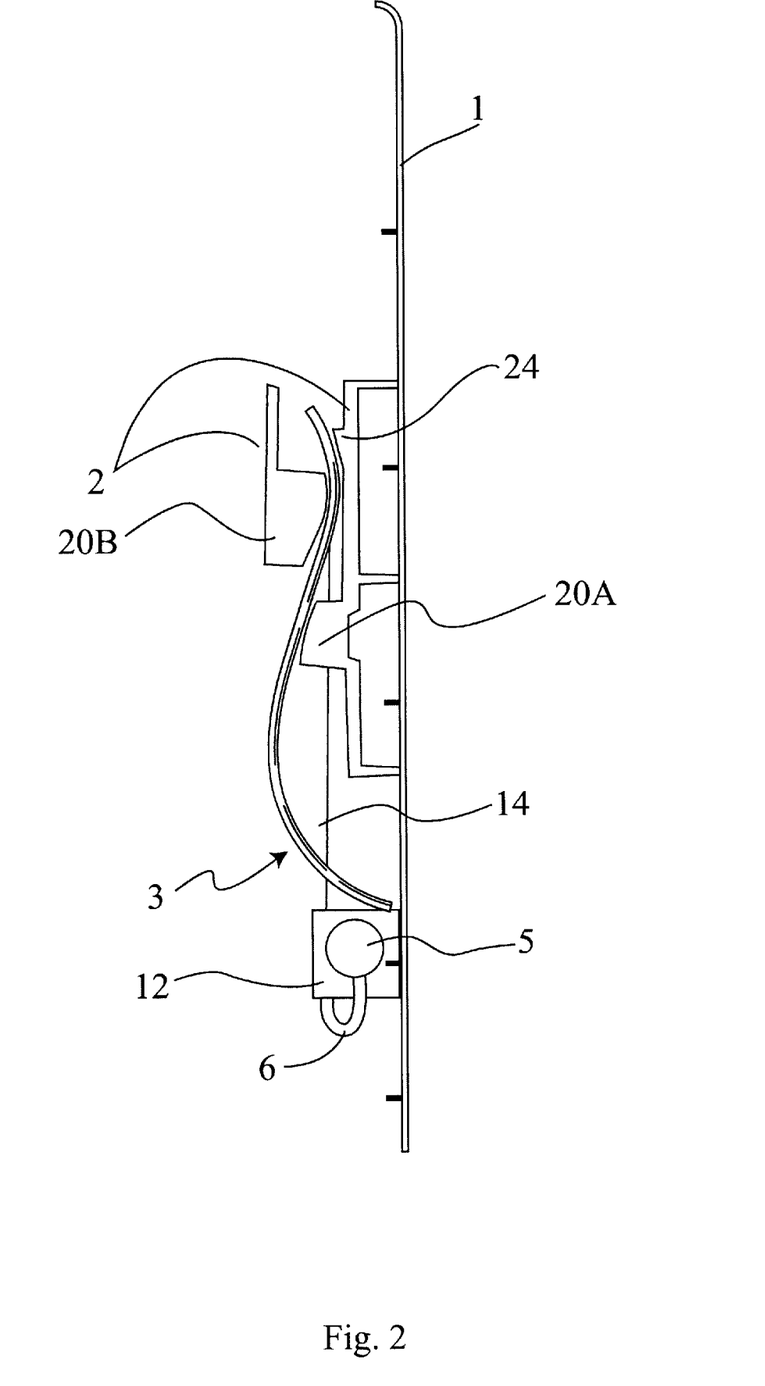
FIG. 2 is a schematic, cut away side view of the unitized back plate and lumbar support of the present invention depicting a lumbar support and paddle in a retracted position.
Figure 3:
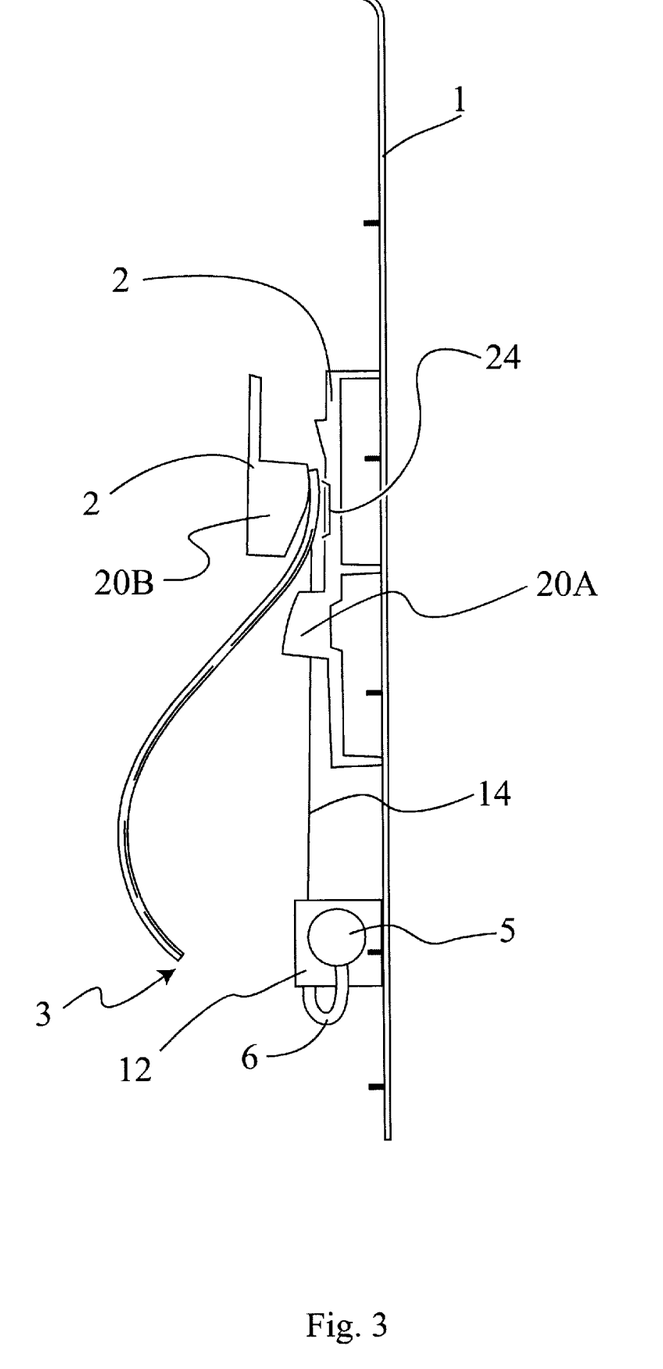
FIG. 3 is a schematic, cut away side view of the unitized back plate and lumbar support device of the present invention, depicting the lumbar support paddle in an extended position.

FIGS. 2 and 3 are side views of the back plate and lumbar support of the present invention. FIG. 2 shows the lumbar support paddle in a retracted or flat position. FIG. 3 shows the lumbar support paddle in an extended or lumbar supporting position. Back plate, 1, and lumbar support housing, 2, are fabricated from a single piece of material, preferably plastic but alternatively metal. It can be seen in FIGS. 2 and 3 that the interior of housing, 2, has molded or stamped into it a boss, 20, or a pair of bosses, which define a channel into which the engaged end of lumbar support paddle, 3, is inserted. Actuator, 5, mediates travel of the paddle, 3, from a retracted position to an extended position by means of traction on a cable or rod, 14, which is pivotally attached at the encapsulated end of lumbar support paddle, 3, at bracket 24.

The thin end of the guide bosses are oriented toward the top of the housing and the top of the page in FIGS. 2 and 3. The thicker portion of guide boss, 20, is oriented toward the bottom in FIGS. 2 and 3. The encapsulated end of lumbar support paddle, 3, is tapered, (not shown in FIGS. 2 and 3) with the wider portion of the taper oriented toward the top of the housing and top of the page in FIGS. 2 and 3 and becoming more thin as the encapsulated portion of lumbar support paddle, 3, exits housing, 2, and thinner still toward its unanchored end at the bottom. The tapers of both the encapsulated end of lumbar support paddle, 3, and the guide bosses, 20, are arcuate and complementary. These arcuate surfaces of guide bosses, 20, and paddle, 3, slidingly engage upon travel of the paddle from its retracted to its extended position in order to guide the travel of the paddle along an arcuate path. This path simultaneously extends the paddle outwards towards the seat occupant as traction draws the paddle downwards.

Figure 4:
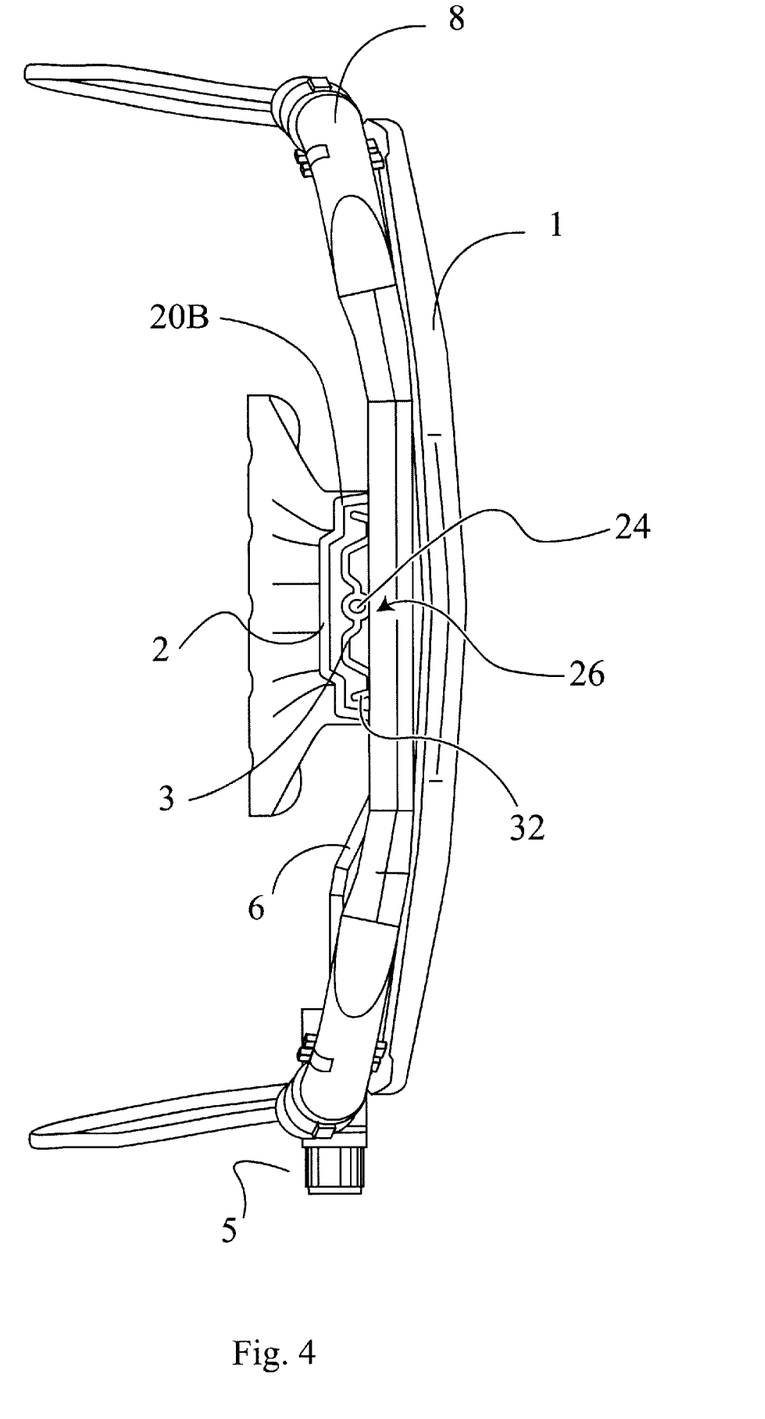
FIG. 4 is a top view of the unitized back plate and lumbar support device of the present invention.

FIG. 4 is a top view of the unitized back plate and lumbar support. Lumbar support housing, 2, is fabricated from the same piece of material as back plate, 1. Lumbar support paddle, 3, is depicted in the retracted position in FIG. 4.

FIG. 4, illustrates a preferred embodiment of the lumbar support housing molding. The two guide bosses, 20, defining a channel which receives the engaged end of the lumbar support paddle, 3, are obscured in FIG. 4 because the thin end of the guide bosses, 20, are facing the viewer, oriented out of the plane of the page in FIG. 4.

FIG. 4 depicts the tripartate aspects of the encapsulated end of lumbar support paddle, 3. The outer edges of the encapsulated end of the paddle define flanges, 32, configured to cooperate with the guide bosses (not shown) with which they are slidingly engaged. The central portion, 26, of the encapsulated end of the lumbar support paddle, 3, travels through the central channel defined between guide bosses (not shown). Throughout its length, the central portion of the paddle preferably has ridges, 30, which provide strength to the paddle. Ridges, 30, taper out as they approach the unanchored end of paddle until they are flat.

Figure 5A:
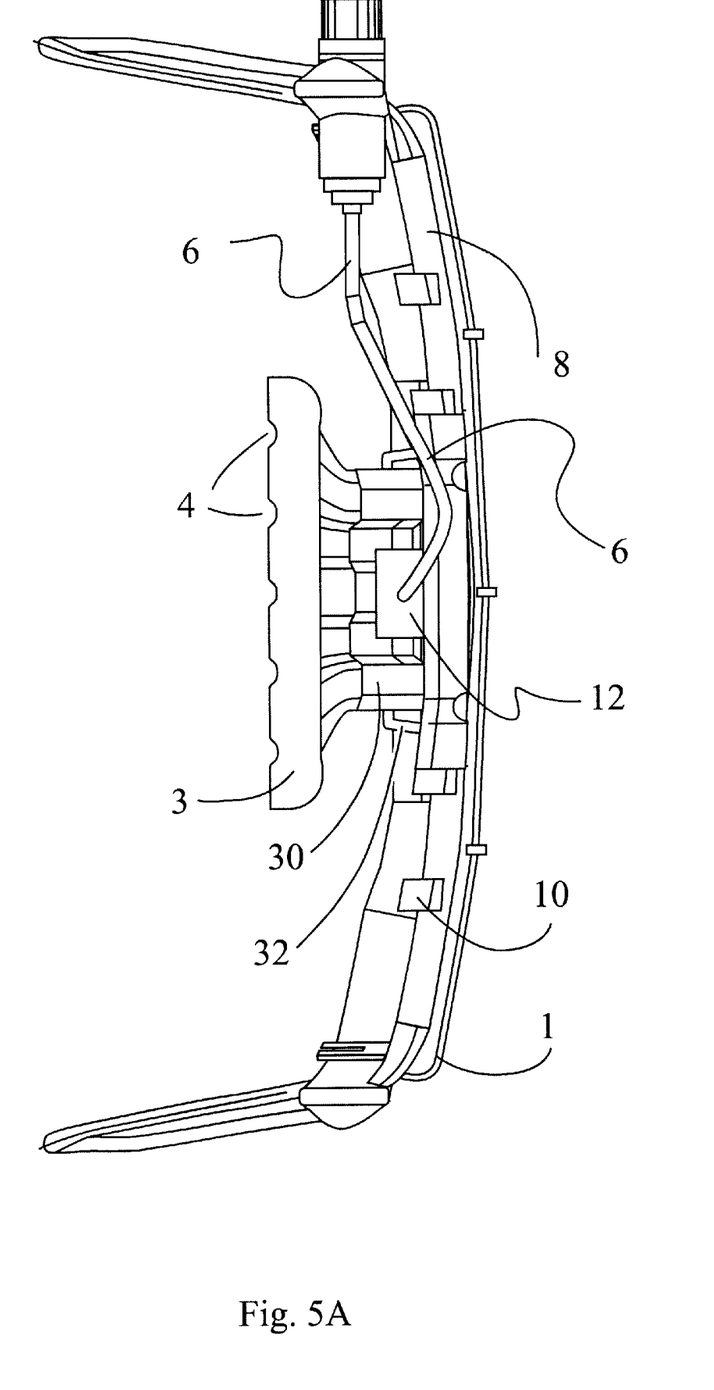
FIG. 5A is a bottom view of the unitized back plate and lumbar support device of the present invention.
Figure 5B:
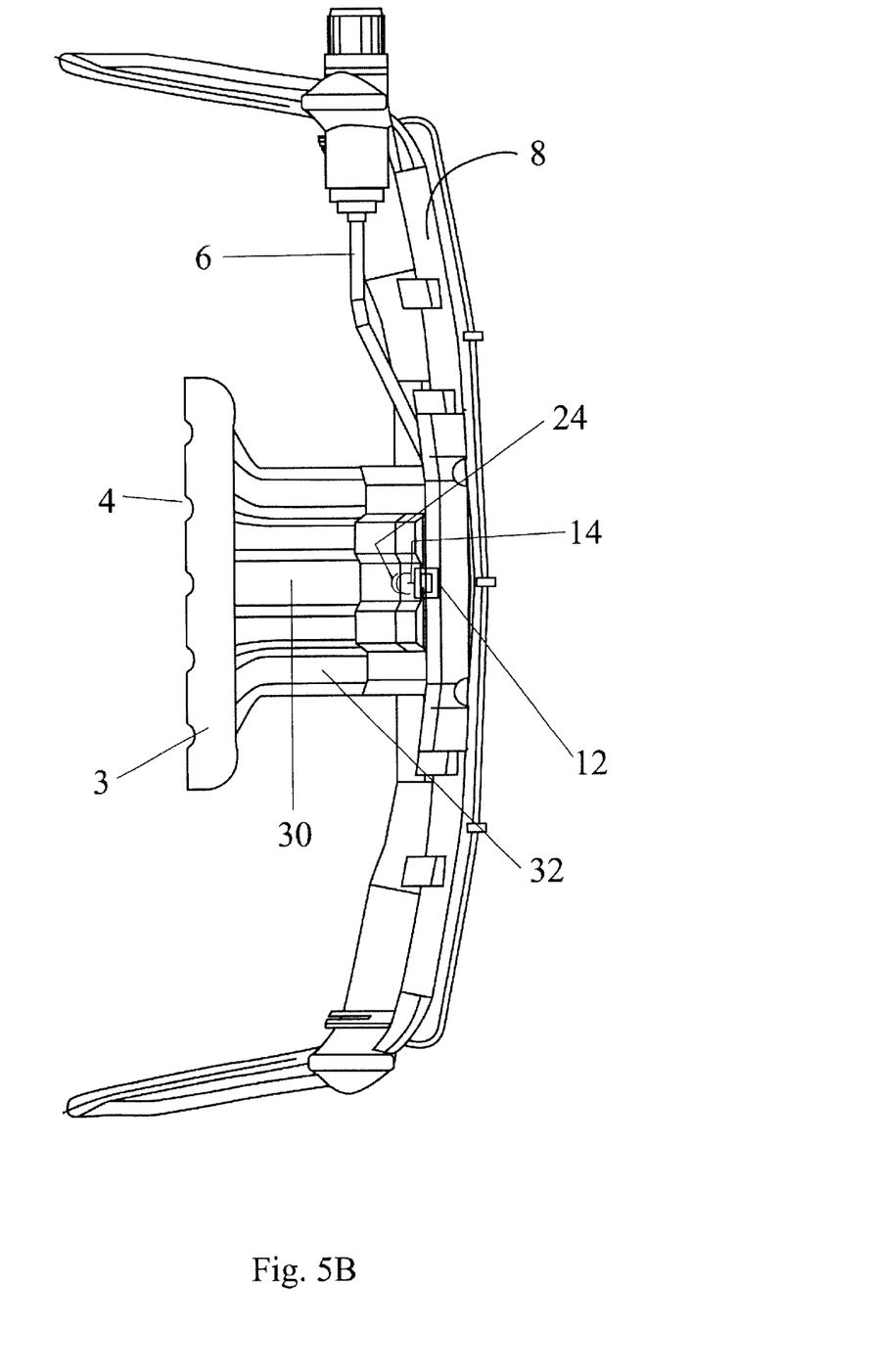
FIG. 5B is another bottom view of the unitized back plate and lumbar support device of the present invention.

At its upper most edge the central portion of the encapsulated end of the paddle provides a pivotal anchor for traction elements from the actuating device, 24. In FIG. 4, the top view, the Bowden cable conduit anchor is obscured from view. In FIGS. 5A and 5B, the bottom view, the Bowden cable conduit anchor, 12, is visible under the unanchored end of support paddle, 3. In FIG. 5B, with the paddle, 3, extended, the Bowden cable wire, 14, exits the Bowden cable, 6, at Bowden cable conduit anchor, 12, and attaches at pivotal anchor, 24, at the top edge of paddle, 3. FIG. 5B also shows return biasing springs, 7.

The Bowden cable wire 14 may be substituted with any traction element, including a wire, hard drawn wire, pin or spoke.

Guide bosses 20, and, optionally, upper guide bosses (not shown), are fixedly attached to support housing, 2. Preferably they are molded bosses. Preferably the housing is plastic, but may be comprised of other materials. It is preferred that the sliding surfaces of the guides and basket define a smooth, stepless curve, but straight or stepped surfaces are contemplated to be alternative embodiments within the scope of the present invention.

Figure 6A:
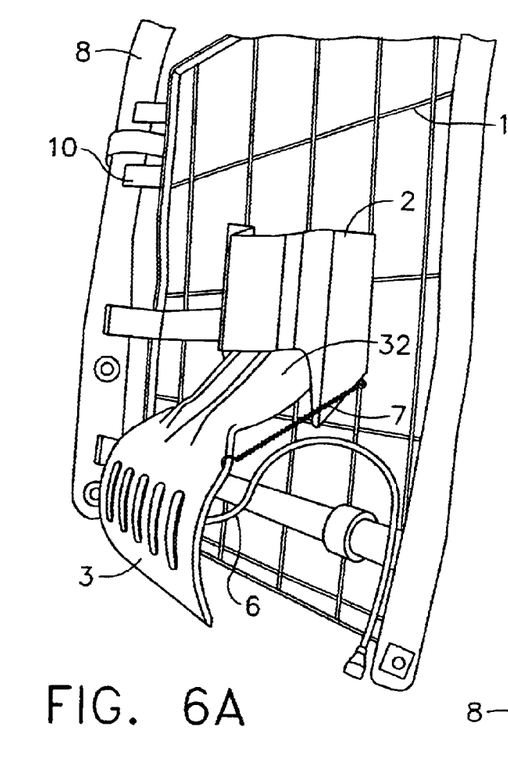
FIG. 6A is a side, perspective view of the unitized back plate and lumbar support of the present invention with the lumbar support paddle in an extended position.
Figure 6B:
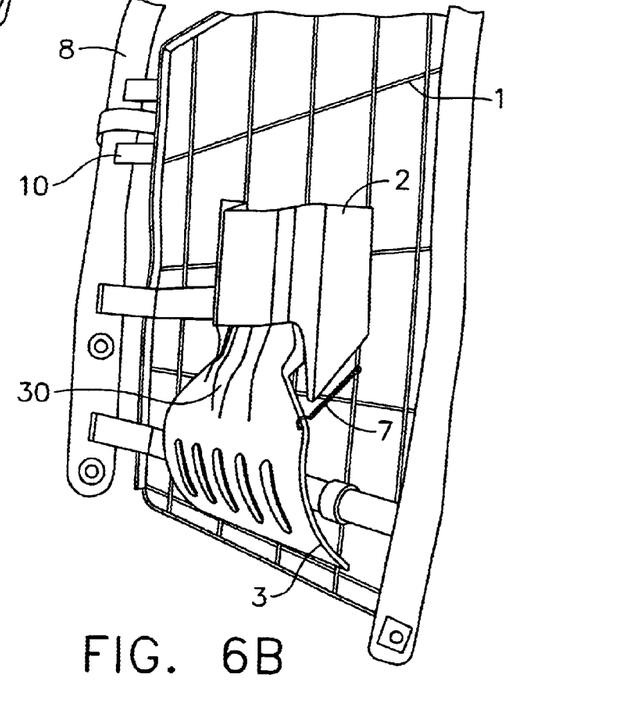
FIG. 6B is a side, perspective view of the unitized back plate and lumbar support of the present invention with the lumbar support paddle in a retracted position.

FIGS. 6A and 6B are perspective side views of the unitized pressure plate and lumbar support. FIG. 6A is with the lumbar support paddle, 3, in its extended position, and 6B is with the paddle, 3, in its retracted position. FIGS. 6A and 6B further illustrate the extending relationship of the paddle, 3, and the housing, 2. In these views the extent of projection of flanges, 32, is seen. The nature and extent of the ridges, 30, is also shown.

Figure 7A:
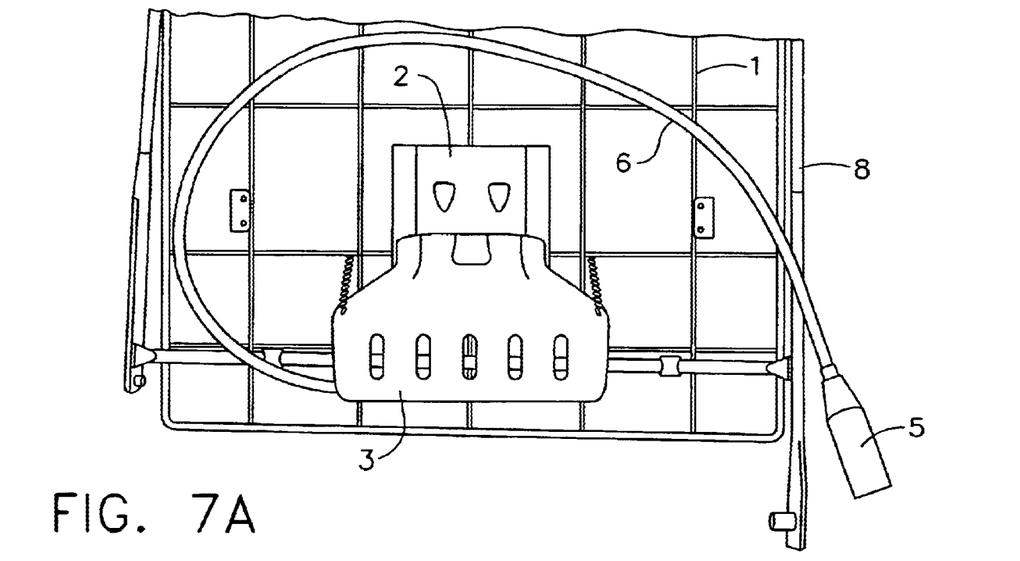
FIG. 7A is a front view of the unitized back plate and lumbar support of the present invention with the lumbar support paddle in an extended position.
Figure 7B:
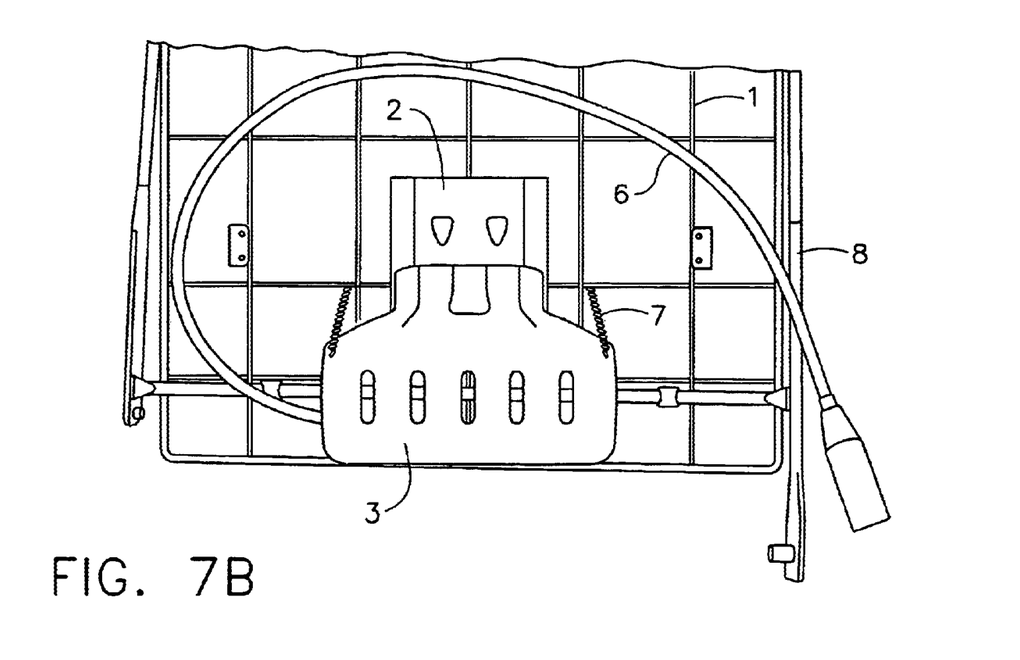
FIG. 7B is a front view of the unitized back plate and lumbar support of the present invention with the lumbar support paddle in a retracted position.

In FIGS. 7 and 7A are shown another front view of the unitized back plate and lumbar support showing the solid construction of back plate and the compact extent of housing, 2, molded onto it. In these depictions Bowden cable, 6, and mechanical actuator, 5, have not been permanently anchored to the seat frame, 8.

Figure 8A:
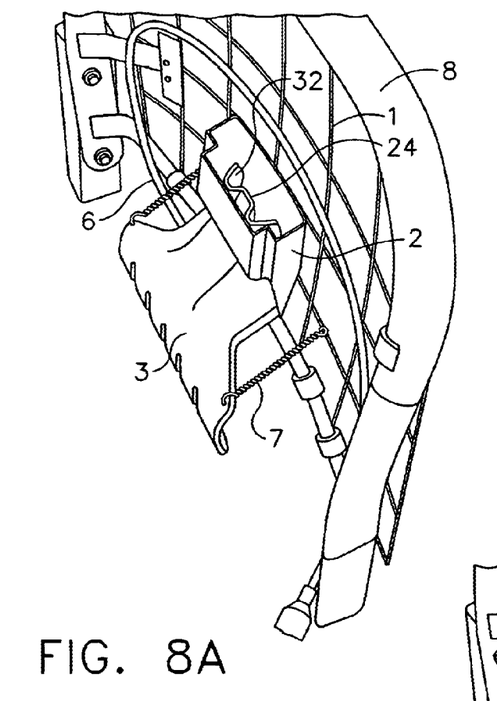
FIG. 8A is a top, perspective view of the unitized back plate and lumbar support of the present invention with the lumbar support paddle in an extended position.
Figure 8B:
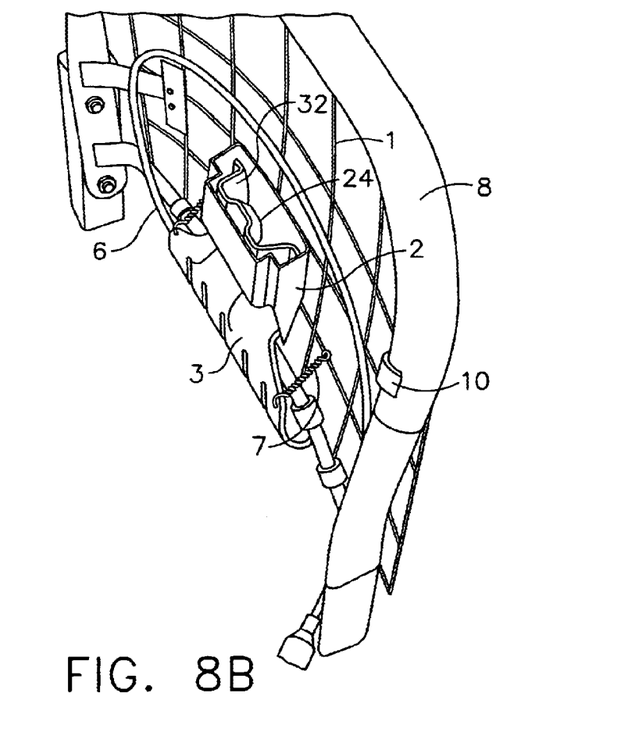
FIG. 8B is a top, perspective view of the unitized back plate and lumbar support of the present invention with the lumbar support paddle in a retracted position.

FIGS. 8A and 8B are top perspective views of the unitized back plate and lumbar support housing with the paddle, 3, in its extended and retracted positions, respectively. Again, the relationship between the flanges, 32, and their cooperation with guide bosses (not shown) of housing, 2, are shown. Traction cable pivoting anchor, 24, is shown.

It is clear from the depictions in FIGS. 1–8 that only one end of the paddle is fixed to the support housing, 2, and thereby to the seat. The other end of the paddle, the weight supporting pressure surface, moves freely, without any fixation to the support housing, 2, or seat. The pressure surface acts outwardly towards the passenger through the fabric of the seat cover, padding, or, optionally, through any conventional seat support systems such as webs, wires, or, sinusoidal springs. The pressure area end of the paddle, 3, being free, flexes under pressure. This flexed position would be assumed by the basket pressure area upon the weight of a passenger being applied against it. This flexion increases passenger comfort and helps prevent damage to the system from abusive loads.

In operation, a seat occupant engages actuator, 5, which, either mechanically or electrically, exerts traction on Bowden cable wire, 14, drawing it into Bowden cable conduit relative to its anchor at 12 on the back plate, 1. This puts downward force on the paddle, 3. Guide bosses, 20, through their sliding curvilinear contact with flanges, 32, of paddle, 3, bias the travel of the paddle, 3, outward. The farther down paddle, 3, is pulled by the wire, 14, of Bowden cable, 6, the farther outwards and towards the seat occupant's lumbar spine the guide bosses, 20, push paddle, 3. When the seat occupant desires to have less lumbar support, the actuator is reversed, loosening tension on Bowden cable wire, 14. The combination of the seat occupant's weight and return biasing spring, 7, act to push paddle, 3, inwards, towards back plate, 1. Again the channel in housing, 2, defined by guide bosses, 20, guide the paddle, 3, upwards into housing, 2, during its return motion. As can be seen and appreciated by those of skill in the art, the unitization of the housing, 2, with back plate, 1, provides for a durable, solid foundation upon which these motions can be made and the requisite tension of the system supported. The back plate further allows for a flexible variety of locations to anchor a Bowden cable conduit anchor, 12, or return biasing springs, 7. As is also apparent to those of skill in the art, the unitization of the housing, 2, with back plate, 1, eliminates the need for a variety of bracket supports and the like to fix a lumbar support to a seat frame, as was required in the prior art.

Method of Assembly

It is clear from the foregoing that the structure of the unitized back plate and lumbar support of the present invention serves to reduce the space taken up within a seat by various components comprising a back plate and lumbar support. The present invention also minimizes the expense involved with a greater number of components required for affixing a lumbar support to a prior art back plate. The present invention also promotes the economy and efficiency of assembly, shipping and packaging that is important to volume production of seats, particularly automobile seats.

In the prior art the seat assembler would receive separately from separate sources a back plate and a lumbar support. Each of these devices would have a plurality of anchoring components for affixing the separate components to a seat frame. This multiplicity of anchoring components increased the time, expense and complexity of assembly. A prior art alternative was to affix back plates to lumbar supports before being forwarded to seat assemblers. This alternative also involved a multiplicity of anchoring components which increased costs and assembly time.

The unitized back plate and lumbar support of the present invention makes assembly much more simple and efficient. No brackets or other fixation devices are necessary to attach the lumbar support housing to the back plate, since they are fabricated as a single unit, preferably by molding in plastic. The single moving part, the lumbar support panel, 3, is assembled simply by sliding the narrower encapsulated end into the channel defined by the guide bosses in housing, 2. This simple process requires no further fixation.

The only other assembly required is engagement of the actuating means. If the actuating means is to be mechanical, as by a bowden cable, the terminal end of the cable is snapped into place at its pivoting fixation to the encapsulated end of the paddle, 24, and then the terminal end of the cable conduit, 6, is snapped into the anchor, 12. Anchor, 12, may be separately fabricated and fixedly attached to back plate, 1, at assembly. Preferably, though, it is also molded into back plate, 1. In the alternative, the lumbar support may be actuated by an electric motor. If so, the tractive force generated by the motor is also transferred to the paddle, 3, through a rod or cable. As with the mechanical means, assembly requires only that the end of this rod or cable be snapped into pivoting anchor, 24, in the encapsulated end of the paddle, 3. Thereafter the motor is placed in seat. Again, the motor seat may be a separate unit fixedly attached to back plate, 1, upon assembly, but preferably is molded into back plate, 1, so that a motor (not shown) may be snapped into place.

Optionally, brackets for attaching the entire unitized back plate and lumbar support unit to a seat frame may be molded into back plate, 1, as illustrated at brackets, 10. Conversely, such brackets may be welded or otherwise affixed to the seat frame, 8, in a pre-determined fashion to receive the unitized back plate lumbar support assembly.

In the depicted embodiments, the actuator is substantially inside the perimeter height, width and thickness dimensions defined by the extending element when the extending element is in its retracted position. In the depicted embodiment the width of the lumbar support is less than about 180 millimeters, the height is less than about 160 millimeters and the thickness in the retracted position is less than about 50 millimeters.

The compact nature of the unitized combination of the present invention also serves the function of economizing on packaging. Back plates are frequently shipped lumbar support assemblers or vice a versa, or both components are shipped to a third party for assembly of the back plate and lumbar support. Two custom tailored packages were required. Typically in the prior art the assembled combination of components would require a new and different package for forwarding to a seat assembler. The compact nature of the unitization system of the present invention allows for the package holding the back plate to be used again as the package in which the assembled back plate lumbar/support combination may be forwarded to a seat assembler. That is, the lumbar support paddle is inserted in the lumbar support housing, and may thereafter be reinserted in the same package in which the back plate alone arrived.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. A unitized back plate and lumbar support for a seat comprising:

a back plate;

a housing having a channel defined by at least one guide boss, said housing being attached to said back plate;

an extending element having a weight supporting end and an engaged end, said engaged end being slidingly disposed within said channel of said housing; and an actuator engaged with said extending element;

whereby said actuator mediates travel of said weight supporting end of said extending element between a substantially retracted position and an extended position.

2. The unitized back plate and lumbar support for a seat of claim 1 further comprising:

a second housing having a second channel defined by at least one second guide boss, said second housing being attached to said back plate;

a second extending element having a second weight supporting end and a second engaged end slidingly disposed within said second channel of said second housing; and a second actuator engaged with said second extending element;

whereby said second actuator mediates travel of said second weight supporting end of said second extending element between a substantially retracted position and an extended position.

3. The unitized back plate and lumbar support for a seat of claim 2 wherein:

said second weight supporting end of said second extending element is bifurcated to form two lateral extensions disposed on opposite sides of said weight supporting surface of said extending element.

4. The unitized back plate and lumbar support of claim 1 wherein said actuator includes a traction element selected from the group consisting of: a wire, a bowden cable, a hard drawn wire, a pin, a rod, and a spoke.

5. The unitized back plate and lumbar support of claim 1 wherein said extending element is comprised of plastic.

6. The unitized back plate and lumbar support of claim 1 wherein said housing is comprised of plastic.

7. The unitized back plate and lumbar support of claim 1 wherein said weight supporting end of said extending element is arcuate.

8. The unitized back plate and lumbar support of claim 1 wherein said actuator is a Bowden cable.

9. The unitized back plate and lumbar support of claim 1 wherein said actuator is attached to said back plate.

10. The unitized back plate and lumbar support of claim 1 wherein said actuator is substantially inside the perimeter height, width, and thickness dimensions defined by said extending element, when said extending element is in said retracted position.

11. The unitized back plate and lumbar support of claim 1 wherein said weight supporting end of said extending element is flexible.

12. The unitized back plate and lumbar support device of claim 1 wherein said back plate and said housing are a single element integrally fabricated together of the same material.

13. The unitized back plate and lumbar support device of claim 12 wherein said back plate and said housing are stamped from a single piece of metal.

14. The unitized back plate and lumbar support device of claim 12 wherein said back plate and said housing are a single piece of molded plastic.

15. The unitized back plate and lumbar support device of claim 1 wherein said back plate has integrally formed mounting brackets.

16. A unitized back plate and lumbar support for a seat comprising:

a back plate;

a housing having an arctuate channel defined by at least one guide boss, said housing being attached to said back plate;

an extending element having a weight supporting end and an engaged end, said engaged end being slidingly disposed within said arctuate channel of said housing; and an actuator engaged with said extending element;

whereby said actuator mediates travel of said weight supporting end of said extending element between a substantially retracted position and an extended position.

17. A seat comprising:

a bottom surface for supporting the weight of an occupant, said seat bottom having a first frame;

a back for holding the torso of an occupant upright, said seat back having a second frame;

a back plate attached to said second frame;

a housing attached to said back plate and having a arctuate channel defined by at least one guide boss;

an extending element having a weight supporting end and an engaged end, said engaged end being slidingly disposed within said arctuate channel of said housing; and an actuator attached to said second frame, said actuator being engaged with said extending element;

whereby said actuator mediates travel of said weight supporting end of said extending element between a substantially retracted position and an extended position.

18. A unitized back plate and lumbar support for a seat comprising:

a back plate, said back plate including a housing and said back plate having an anchor;

a channel in said housing, said channel being defined by two lower guide bosses and two upper guide bosses, said upper guide bosses and said lower guide bosses being arcuate;

a paddle having a first end and a second end, said first end having arcuate flanges, said arcuate flanges being in sliding communication with said upper guide bosses and said lower guide bosses inside said channel, and said first end having an anchor, and said second end being disposed to provide ergonomic support to a seat occupant;

a Bowden cable, said Bowden cable having,
  a conduit, and
  said Bowden cable having a wire, said wire being slidingly disposed within said conduit, and
  said Bowden cable having a first end operatively engaged with an actuator, and
  said Bowden cable having a second end in operative engagement with said lumbar support such that said conduit is attached to said anchor of said back plate and said wire is attached to said anchor of said first end of said paddle.

19. A method of unitizing a back plate and a lumbar support comprising:

integrally fabricating together a back plate and a housing, said housing having a channel;

inserting a paddle into said channel of said housing; and anchoring a first end of a traction cable conduit to said back plate, and operatively engaging a first end of a traction cable wire with said paddle to mediate travel of said paddle between a retracted position and an extended position.

20. The method of claim 19 further comprising:

operatively engaging a traction device with said paddle to mediate travel of said paddle between a retracted position and an extended position.

21. The method of claim 19 further comprising:

operatively engaging an actuator with a second end of said traction cable conduit and with a second end of said traction cable wire.

22. The method of claim 19 wherein said traction element is a Bowden cable.

23. The method of claim 19 wherein said step of fabricating together said back plate and said housing is by stamping metal.

24. The method of claim 19 wherein said step of fabricating together said back plate and said housing is by molding said back plate and said housing as a single piece of plastic.

25. A method of shipping a unitized back plate and lumbar support comprising" fabricating together aback plate and a housing, said housing having a channel;

packaging said back plate and said housing in a package having a re-sealable opening;

shipping said package to an assembler;

opening said re-sealable opening of said package;

inserting a paddle into said channel of said housing;

without removing said back plate and said housing from said package; and re-sealing said re-sealable opening of said package.

26. The method of claim 25 further comprising;

Operatively engaging a traction device with said paddle to mediate travel of said paddle between a retracted position and an extended position.

27. The method of claim 25 further comprising:

anchoring a first end of a traction cable conduit to said back-plate; and anchoring a first end of a traction cable wire to said paddle.

28. The method of claim 27 further comprising:

Operatively engaging an actuator with a second end of said traction cable conduit and with a second end of said traction cable wire.

29. The method of claim 27 wherein said traction cable is a bowden cable.

30. The method of claim 25 wherein said step of fabricating together said back pate and said housing is by stamping metal.

31. The method of claim 25 wherein said step of fabricating together said back plate and said housing is by molding said back plate and said housing as a single piece of plastic.

* * * * *